United States Patent
Jung et al.

(10) Patent No.: US 8,711,060 B2
(45) Date of Patent: Apr. 29, 2014

(54) TIME SHARING TYPE AUTOSTEREOSCOPIC DISPLAY APPARATUS AND METHOD FOR DRIVING THE SAME

(75) Inventors: Sung-yong Jung, Suwon-si (KR); Sergey Shestak, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2038 days.

(21) Appl. No.: 11/689,227

(22) Filed: Mar. 21, 2007

(65) Prior Publication Data

US 2007/0229951 A1  Oct. 4, 2007

(30) Foreign Application Priority Data

Apr. 3, 2006 (KR) .................. 10-2006-0030152

(51) Int. Cl.
*G09G 5/00* (2006.01)
(52) U.S. Cl.
USPC .................. 345/6; 345/419; 348/51; 348/58; 359/465
(58) Field of Classification Search
USPC .......... 345/419, 32, 6–9, 87–100; 348/51–58, 348/42; 359/462–477
See application file for complete search history.

(56) References Cited

U.S. PATENT DOCUMENTS

| | | | | |
|---|---|---|---|---|
| 4,719,507 A | * | 1/1988 | Bos | 348/57 |
| 5,572,341 A | * | 11/1996 | Fergason | 349/200 |
| 5,917,562 A | * | 6/1999 | Woodgate et al. | 349/15 |
| 6,233,170 B1 | * | 5/2001 | Yamada | 365/145 |
| 6,975,345 B1 | * | 12/2005 | Lipton et al. | 348/57 |
| 7,408,600 B2 | | 8/2008 | Yata et al. | |
| 7,646,537 B2 | | 1/2010 | Shestak | |
| 2002/0003509 A1 | * | 1/2002 | Lipton et al. | 345/7 |
| 2004/0222945 A1 | * | 11/2004 | Taira et al. | 345/6 |
| 2006/0192962 A1 | | 8/2006 | Choi | |
| 2006/0221284 A1 | | 10/2006 | Yata et al. | |
| 2007/0153380 A1 | | 7/2007 | Shestak | |

FOREIGN PATENT DOCUMENTS

| | | |
|---|---|---|
| JP | 11-298918 A | 10/1999 |
| JP | 2000-284223 A | 10/2000 |
| JP | 200175044 A | 3/2001 |
| JP | 2002101427 A | 4/2002 |

(Continued)

OTHER PUBLICATIONS

Communication dated Dec. 26, 2012 issued by the Korean Intellectual Property Office in counterpart Korean Patent Application No. 10-2006-0030152.

(Continued)

*Primary Examiner* — Hong Zhou
(74) *Attorney, Agent, or Firm* — Sughrue Mion, PLLC

(57) ABSTRACT

A time sharing type autostereoscopic display apparatus and a method for driving the same are provided. The display apparatus includes a display panel; a polarization switch; and a control unit which controls the polarization switch so that each of N segments of the polarization switch is driven in synchronization with an image scanning time of the display panel corresponding to each segment, and controls the polarization switch so that a time when a driving signal is applied to an initial segment is delayed relative to a time when an image starts to be scanned after a vertical synchronization signal is applied to the display panel. The method includes controlling the display apparatus so that a time when a driving signal is applied to an initial segment delayed relative to a time when an image starts to be scanned.

11 Claims, 14 Drawing Sheets

(56) References Cited

FOREIGN PATENT DOCUMENTS

| | | |
|---|---|---|
| JP | 2003-167545 A | 6/2003 |
| JP | 2003202519 A | 7/2003 |
| JP | 2003-233351 A | 8/2003 |
| JP | 2005-62773 A | 3/2005 |
| KR | 10-0449879 B1 | 9/2004 |
| KR | 10-2006-0106726 A | 10/2006 |
| KR | 10-2007-0073036 A | 7/2007 |

OTHER PUBLICATIONS

Communication dated Feb. 28, 2012 from the Japanese Patent Office in counterpart Japanese application No. 2007-077392.
Communication dated Jun. 27, 2012 issued by the Korean Intellectual Property Office in counterpart Korean Application No. 10-2006-0030152.
Communication dated Oct. 9, 2012, issued by the Japanese Patent Office in counterpart Japanese Patent Application No. 2007-077392.

* cited by examiner

TIME SHARING TYPE AUTOSTEREOSCOPIC DISPLAY APPARATUS AND METHOD FOR DRIVING THE SAME

CROSS-REFERENCE TO RELATED PATENT APPLICATIONS

This application claims priority from Korean Patent Application No. 10-2006-0030152, filed on Apr. 3, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a time sharing type autostereoscopic display apparatus and a method for driving the same, and more particularly, to a time sharing type autostereoscopic display apparatus using a hold type display such as a liquid crystal display (LCD) and a method for driving the same.

2. Description of the Related Art

Time sharing type autostereoscopic display apparatuses are autostereoscopic display apparatuses which display an image for a left eye and an image for a right eye alternately on the entire screen at a very fast time period and simultaneously provide separated images to the left eye and the right eye in synchronization with a display period of the image for the left eye and the image for the right eye. For example, in liquid crystal shutter glasses time sharing type autostereoscopic display apparatuses, a left-eye unit of liquid crystal shutter glasses transmits light and a right-eye unit of the liquid crystal shutter glasses intercepts light while a left-eye image is displayed. In addition, the right-eye unit of the liquid crystal shutter glasses transmits light and the left-eye unit thereof intercepts light while a right-eye image is displayed. However, the liquid crystal shutter glasses time sharing type autostereoscopic display apparatuses require a complicated device for synchronizing the liquid crystal shutter glasses and the display and a circuit for driving the same and have a disadvantage of very high costs.

U.S. Pat. No. 3,858,001 discloses a related art time sharing type stereoscopic display system having a mechanical structure in which a linear polarization plate 12 that reciprocally rotates on the entire surface of a cathode ray tube (CRT) display 11 at 90 degrees, as illustrated in FIG. 1. In the case of the stereoscopic display system illustrated in FIG. 1, the linear polarization plate 12 is reciprocally rotated so that the angle of the linear polarization plate 12 is changed while an image for a left eye (LE) is displayed and the angle of the linear polarization plate 12 is changed again while an image for a right eye (RE) is displayed. After that, two polarization plates 13a and 13b of polarization glasses separate the image for the left eye and the image for the right eye from each other, respectively.

In addition, U.S. Pat. No. 4,719,507 discloses another related art time sharing type stereoscopic image display system having an electro-optic structure in which a linear polarization plate 14 is fixed on the entire surface of a CRT display 11 and a polarization switch 15 is disposed on the entire surface of the linear polarization plate 14, as illustrated in FIG. 2. The polarization switch 15 is characterized in that the direction of polarization of an incident light is changed according to an applied voltage. Thus, in the case of the related art stereoscopic image display system of FIG. 2, a voltage applied to the polarization switch 15 is adjusted so that the polarization switch 15 changes the direction of polarization of the incident light to one direction while an image for a left eye is displayed. Then, the polarization switch 15 changes the direction of polarization of the incident light to another direction while an image for a right eye is displayed. After that, two polarization plates 13a and 13b of polarization glasses separate the image for the left eye (LE) and the image for the right eye (RE) from each other, respectively.

However, a problem exists in the related art in that crosstalk occurs in the above-described techniques. As illustrated in FIG. 3, a display system sequentially scans an image of one frame from upward to downward of a screen and allows an image of a next frame to be displayed on an upper portion of the screen while an image of a previous frame is displayed on a lower portion of the screen. For example, when a period in which one frame is completely scanned is T, the image for the right eye is displayed on the entire surface at time 0 and the image for the left eye is displayed on the entire screen at time T. However, since the image for the right eye is consecutively changed into the image for the left eye between time 0 and time T, the image for the left eye is displayed on the upper portion of the screen and the image for the right eye is displayed on the lower portion of the screen. As a result, a time when the image for the left eye and the image for the right eye share the screen exists. Thus, as illustrated in FIGS. 1 and 2, if the direction of polarization is changed with respect to an image on the entire display screen, cross-talk, in which the image for the right eye and the image for the left eye appear if they are not completely separated from each other but are mixed with each other, occurs.

To address the problem, International Publication No. WO 98/44746 suggests the use of a divided type polarization switch. The divided type polarization switch is a polarization switch having a plurality of segments divided in a longitudinal direction, and a voltage signal is applied to each of the segments in synchronization with an image scanning time of a CRT corresponding to each of the segments. Conventionally, a time when a voltage signal is applied to one segment is faster than the image scanning time of the CRT corresponding to the segment, because a slight transition period is needed until the polarization switch reaches a normal state.

FIG. 4 is a timing diagram illustrating a method for driving a 5-divided polarization switch of a related art time sharing type stereoscopic image display apparatus using a CRT. For example, it is assumed that each segment of the polarization switch changes the direction of polarization of an incident light so that the direction of polarization of an emitted light can be identical with a polarization plate for a left eye of polarization glasses when an applied voltage is high and so that the direction of polarization of the emitted light can be identical with a polarization plate for a right eye of the polarization glasses when an applied voltage is low. In addition, in FIG. 4, T denotes a period in which a screen is refreshed, B denotes a blank time required until the screen starts being scanned, and P denotes an instant when a phosphor of the CRT emits light. In a related art case in which the CRT is used as a display, polarization switching is set to start earlier by a time D than a time when an image starts being scanned. This is because it takes time for transition when the polarization switch is activated. In the case of the CRT in which the phosphor instantaneously emits light using an impulse manner, as illustrated in FIG. 4, a time for driving each segment of the polarization switch coincides with an image display time P for a left eye or right eye of the CRT corresponding to the segment. Thus, cross-talk does not occur.

The above-described related art techniques are concerned about the case where a CRT having a sufficiently high refresh rate as a display apparatus is used. However, since an LCD panel having a very high refresh rate has been recently developed, an LCD can be used as a display panel for a time sharing type stereoscopic image display apparatus, instead of a CRT. However, unlike the instantaneously light-emitting CRT, the LCD is driven as a hold type display panel in which a pixel is kept in a light-emitting state while the LCD is turned on. Moreover, the response speed of the LCD is slower than that of the CRT. Accordingly, when the LCD is used as a display apparatus with the above-described related art techniques, it is not possible to reduce the effect of cross-talk.

SUMMARY OF THE INVENTION

The present invention provides a time sharing type autostereoscopic image display apparatus using a hold type display such as a liquid crystal display (LCD) and a method for driving the same.

According to an aspect of the present invention, there is provided a time sharing type autostereoscopic image display apparatus including a hold type display panel; a divided type polarization switch which is disposed on a front surface of the display panel and is divided into N segments to be independently driven to change a polarization direction of an incident light; and a control unit which controls the divided type polarization switch so that each of the N segments is driven in synchronization with an image scanning time of the hold type display panel corresponding to each segment, wherein the control unit controls the divided type polarization switch so that a time when a driving signal is applied to an initial segment of the N segments of the divided type polarization switch is delayed relative to a time when an image starts to be scanned after a vertical synchronization signal is applied to the hold type display panel.

When a delay time of a driving signal applied to an initial segment of the divided type polarization switch is denoted by D and a driving time interval between two adjacent segments of the sharing type polarization switch is denoted by S, the relationship D=0.8*S ms may be satisfied.

When a period of one frame of the display panel is denoted by T and a blank time required until an image starts being scanned after a vertical synchronization signal is applied to the display panel is denoted by B, the relationship S=(T−B)/N may be satisfied.

The control unit may include a delay unit which adjusts a switching time of the divided type polarization switch by 0 through T.

For example, the hold type display panel may be a liquid crystal display (LCD).

Alternatively, the hold type display panel may be a plasma display panel (PDP), an organic light-emitting device (OLED), or a field emission device (FED), and a linear polarization plate may be disposed between the hold type display panel and the divided type polarization switch.

The autostereoscopic image display apparatus may be a polarization glasses type.

According to another aspect of the present invention, there is provided a method for driving a time sharing type autostereoscopic image display apparatus, the method including controlling the time sharing type autostereoscopic image display apparatus so that a time when a driving signal is applied to an initial segment of a polarization switch is delayed relative to a time when an image starts to be scanned after a vertical synchronization signal is applied to a display panel of the time sharing type autostereoscopic image display apparatus.

According to another aspect of the present invention, there is provided an autostereoscopic image display apparatus including: a backlight unit; a polarization plate which allows light emitted from the backlight unit to have only a certain polarization direction; a polarization switch which changes a polarization direction of an incident light according to a control signal; a birefringent element array in which first and second birefringent elements are alternately disposed, the first and second birefringent elements changing a polarization direction of light incident to the first and second birefringent elements so that polarization directions of light transmitted through the first and second birefringent elements are perpendicular to each other; a lenticular lens sheet which separates the incident light into a left-eye region and a right-eye region and emits the incident light; and a liquid crystal display panel on which an image is displayed, wherein the polarization switch is divided into N segments sequentially switched in synchronization with an image scanning time of the liquid crystal display panel, and a time when a driving signal is applied to an initial segment of the N segments of the divided type polarization switch is delayed relative to a time when an image starts to be scanned after a vertical synchronization signal is applied to the liquid crystal display panel.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 6:
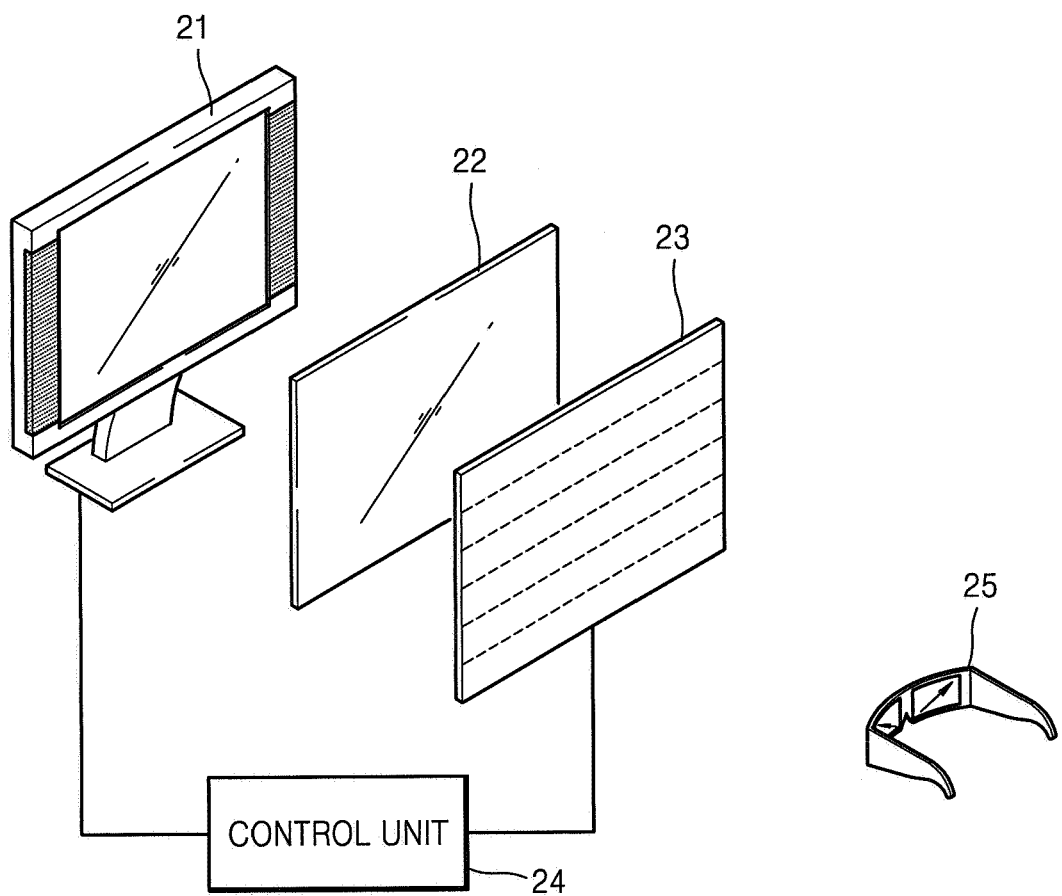
FIG. 6 illustrates a glasses time sharing type autostereoscopic image display apparatus using an LCD according to an exemplary embodiment of the present invention.

FIG. 6 schematically illustrates a time sharing type autostereoscopic image display apparatus using a hold type display panel according to an exemplary embodiment of the present invention. Referring to FIG. 6, the time sharing type autostereoscopic image display apparatus according to an exemplary embodiment of the present invention includes a hold type display panel 21, a linear polarization plate 22, a divided type polarization switch 23, and a control unit 24.

As described previously, the hold type display panel 21 keeps a light-emitting state while it is turned on. For example, a liquid crystal display (LCD) is a representative of the hold type display panel 21. In addition to an LCD, a plasma display panel (PDP), an organic light-emitting device (OLED), a field emission device (FED), or the like, may be used as the hold type display panel.

The linear polarization plate 22 transmits only light in a certain polarization direction among lights emitted from the hold type display panel 21 so that lights incident on the polarization switch 23 have the same polarization direction. The certain polarization direction may be predetermined. However, when an LCD is used as the hold type display panel 21, an additional linear polarization plate 22 is not needed because a linear polarization plate has been already attached to the entire surface of the LCD. The linear polarization plate 22 is used when a hold type display panel for emitting light in a non-polarization state, such as a PDP, an OLED or an FED.

The polarization switch 23 changes the direction of an incident light into a certain direction in response to an electrical driving signal. The certain direction may be predetermined. The polarization switch 23 is a divided type polarization switch having a plurality of horizontal segments divided along a longitudinal direction. Each of the divided segments can be independently driven. As described previously, the display panel 21 sequentially scans an image of one frame from upward to downward, i.e., from the top to bottom of a screen, and an image of a next frame is displayed on an upper portion of the screen while an image of a previous frame is displayed on a lower portion of the screen. Thus, each of the segments of the divided type polarization switch 23 is controlled by the controller 24 so that each segment can be driven in synchronization with an image scanning time of the display panel 21 corresponding to each of the segments.

For example, while an image for a left eye is displayed on the display panel 21, a corresponding segment of the polarization switch 23 is controlled so that the direction of polarization of an emitted light can be directed toward an angle of −45°. While an image for a right eye of a next frame is displayed on the display panel 21, a corresponding segment of the polarization switch 23 is controlled so that the direction of polarization of an emitted light can be directed toward an angle of +45°. Then, the image for a left eye having the polarization direction toward an angle of −45° is transmitted onto a polarization plate for a left eye of polarization glasses 25 and the image for a right eye having the polarization direction toward an angle of +45° is transmitted onto a polarization plate for a right eye of the polarization glasses 25. Thus, an observer can view an autostereoscopic stereoscopic image.

Figure 1:
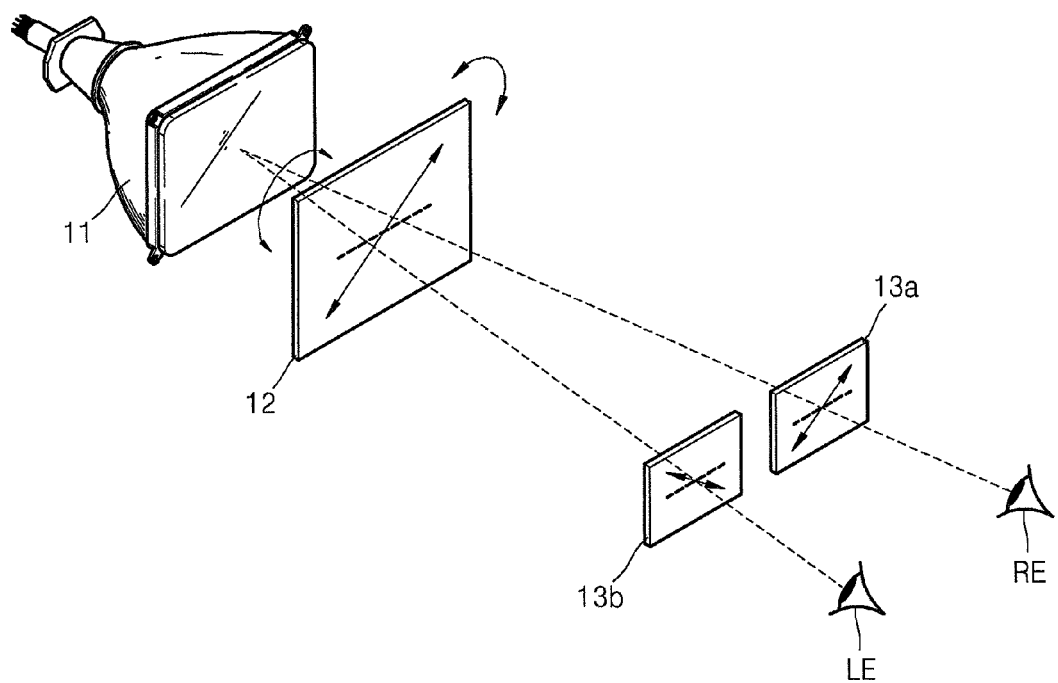
FIGS. 1 and 2 respectively illustrate a related art time sharing type stereoscopic image display system using a cathode ray tube (CRT)
Figure 2:
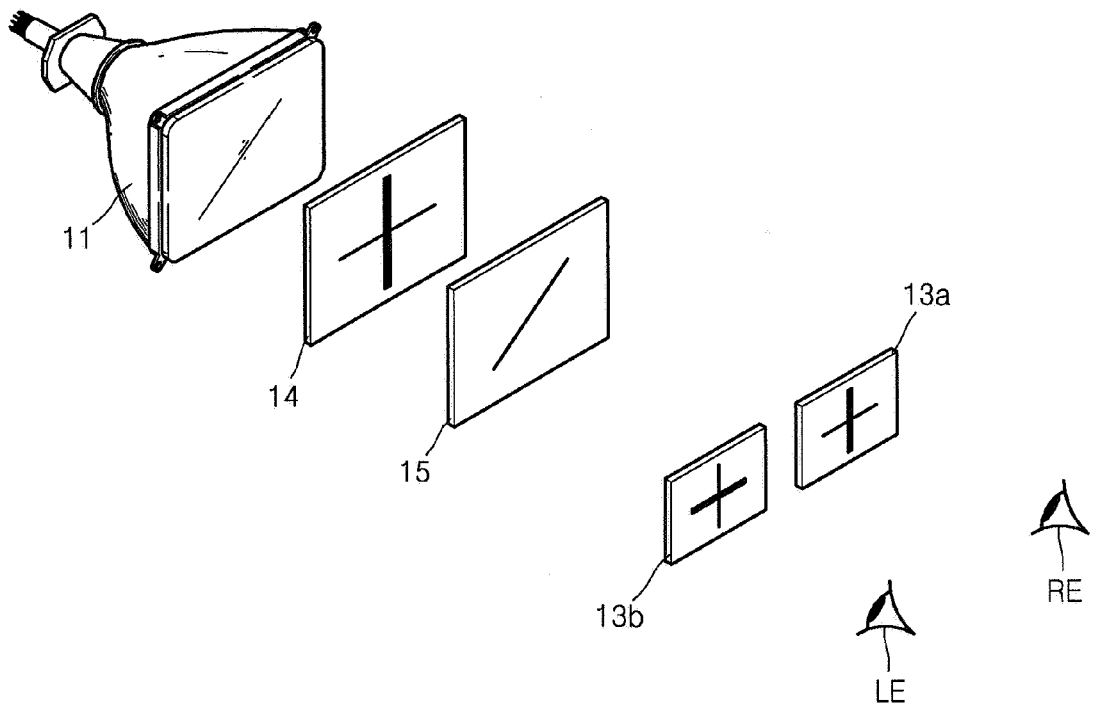
Figure 3:
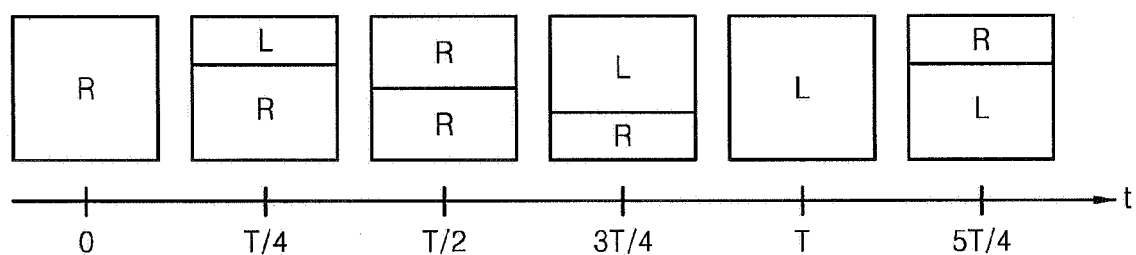
FIG. 3 illustrates an operation of scanning an image for a left eye or a right eye in a display apparatus.
Figure 4:
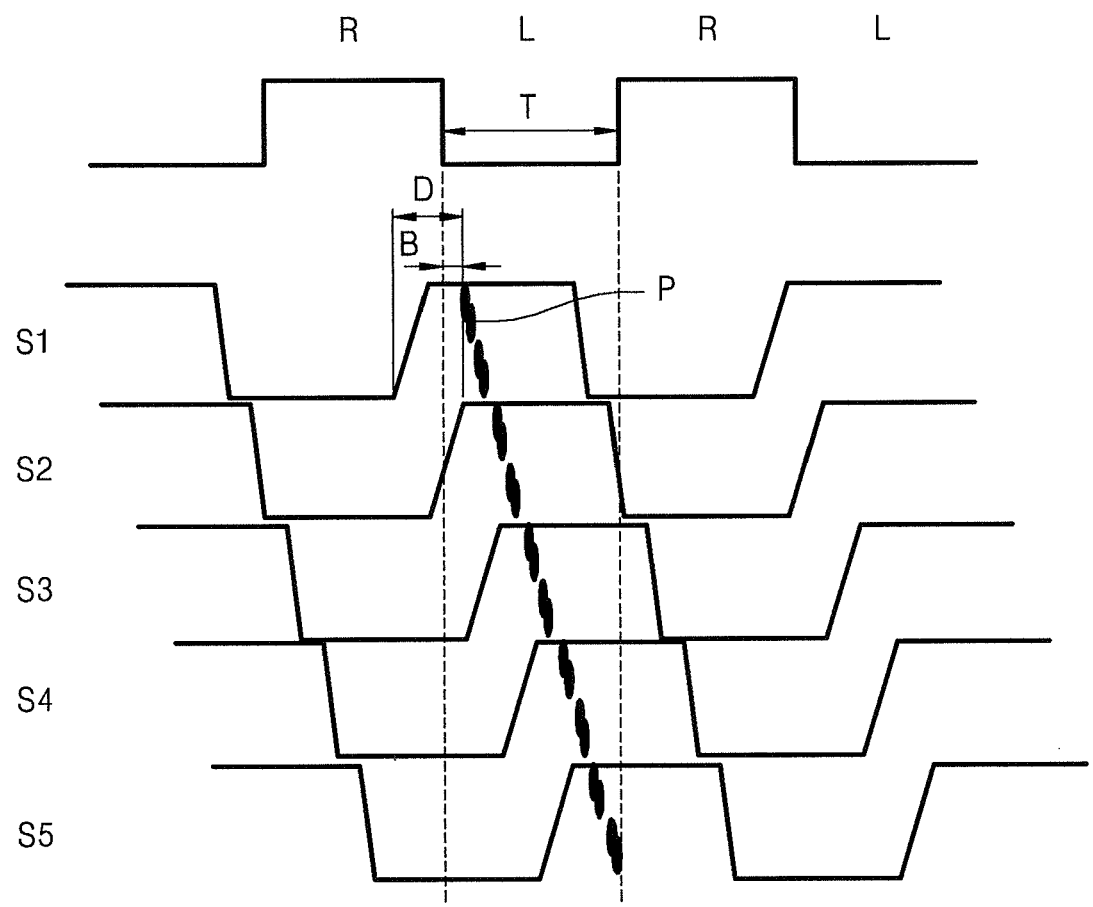
FIG. 4 is a timing diagram illustrating a method for driving a sharing type polarization switch in the related art time sharing type stereoscopic image display system using a CRT.
Figure 5:
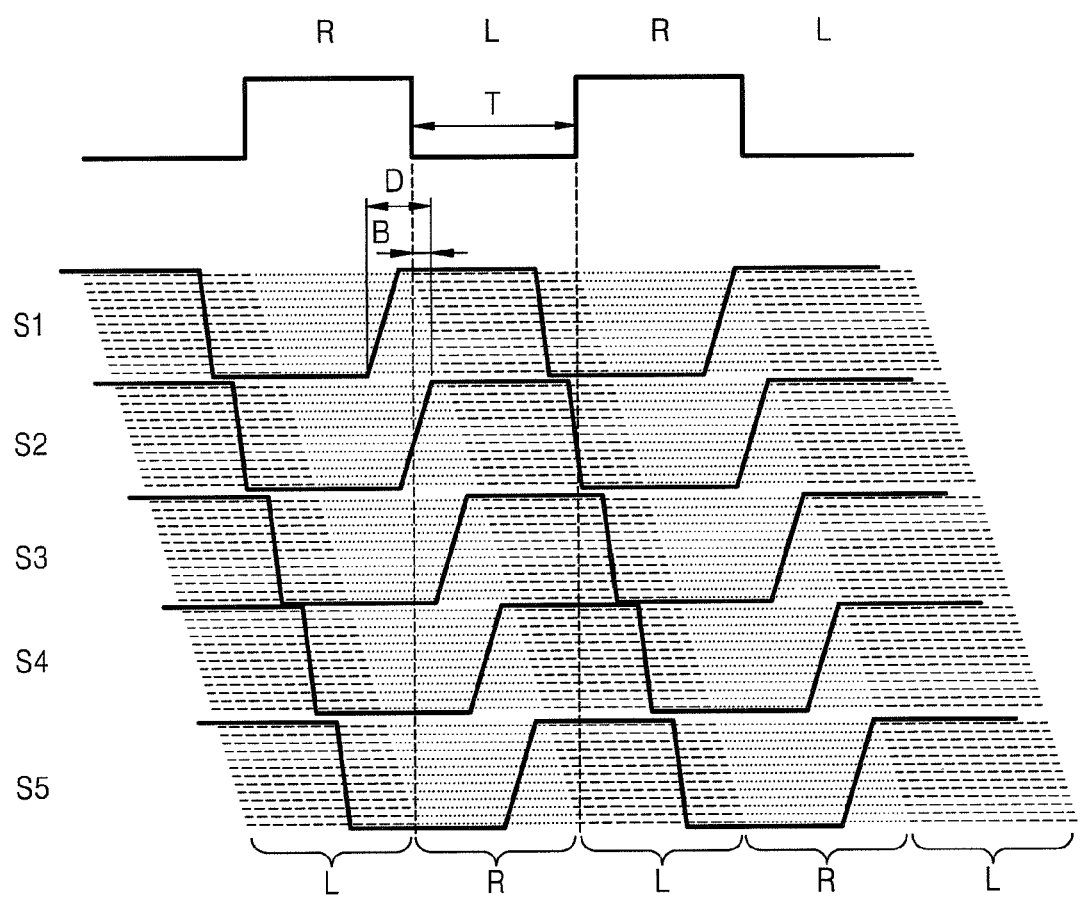
FIG. 5 is a timing diagram illustrating the case where the method for driving the sharing type polarization switch illustrated in FIG. 4 is applied to a time sharing type autostereoscopic image display apparatus using an LCD.

In this case, in order to prevent cross-talk, the control unit 24 controls the polarization switch 23 so that a polarization switching operation of the polarization switch 23 starts while being delayed by an amount of time relative to a time when an image starts to be scanned on the display panel 21. The amount of time may be predetermined. As described previously, in the related art technique using a CRT as a display panel, polarization switching is set to start earlier than a time when an image starts being scanned. However, when the related art driving method is used without changes, the display panel 21 and the polarization switch 23 are not precisely synchronized with each other, as illustrated in FIG. 5. As a result, a portion of an image L for a left eye has a polarization state of an image R for a right eye or a portion of an image R for a right eye has a polarization state of the image R for a left eye. Thus, cross-talk in which the image L for a left eye and the image R for a right eye are mixed in an image passing the polarization glasses 25, seriously occurs. The cause of the cross-talk is that, unlike an impulse type CRT which instantaneously emits light, a pixel is kept in a light-emitting state while a hold type display panel is turned on and the response speed thereof is also slower than the CRT. To address the problem, exemplary embodiments of the present invention allow a switching operation of the polarization switch 23 which starts later than the time when the image starts being scanned on the display panel.

Figure 7:
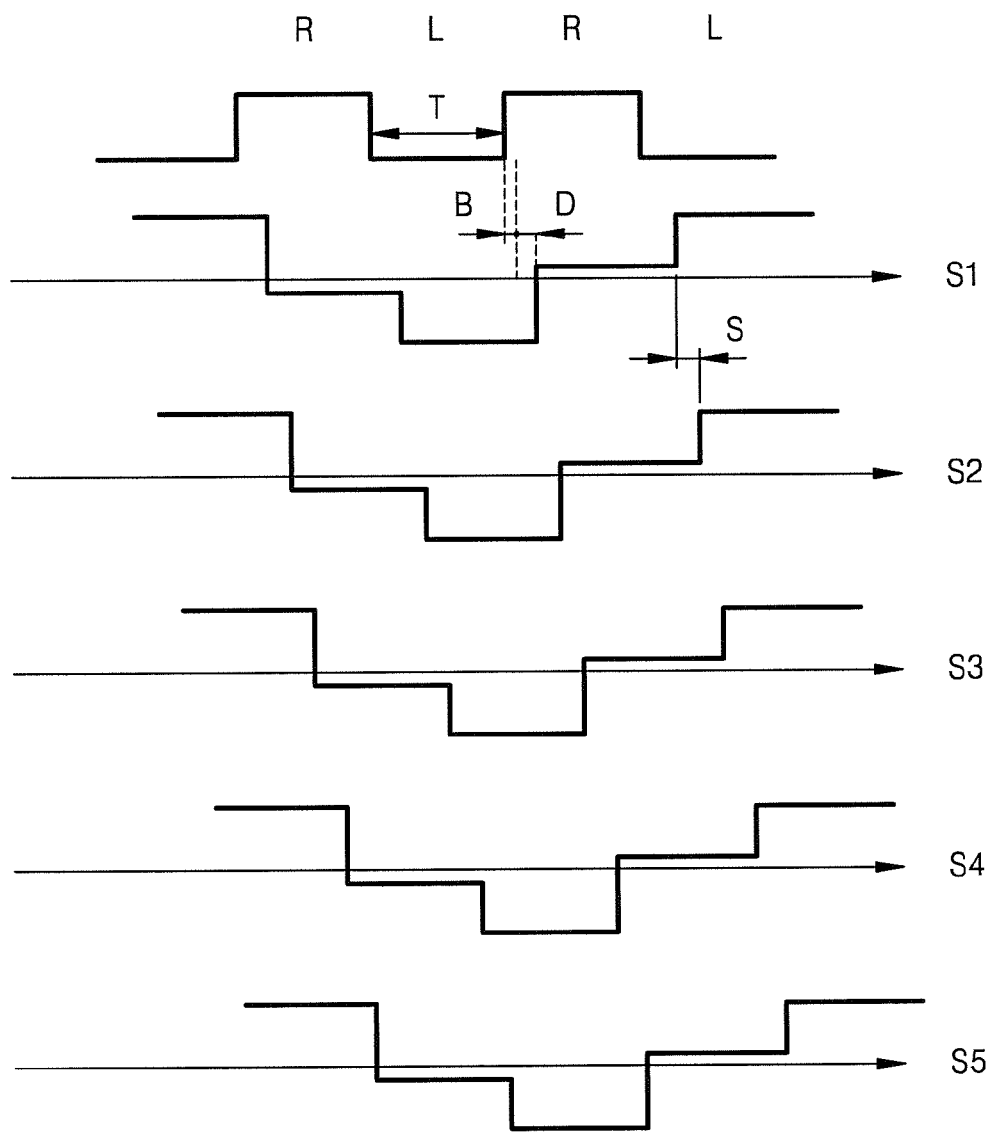
FIGS. 7 and 8 are, respectively, timing diagrams illustrating a method for driving a sharing type polarization switch in the time sharing type autostereoscopic image display apparatus using an LCD illustrated in FIG. 6.
Figure 8:
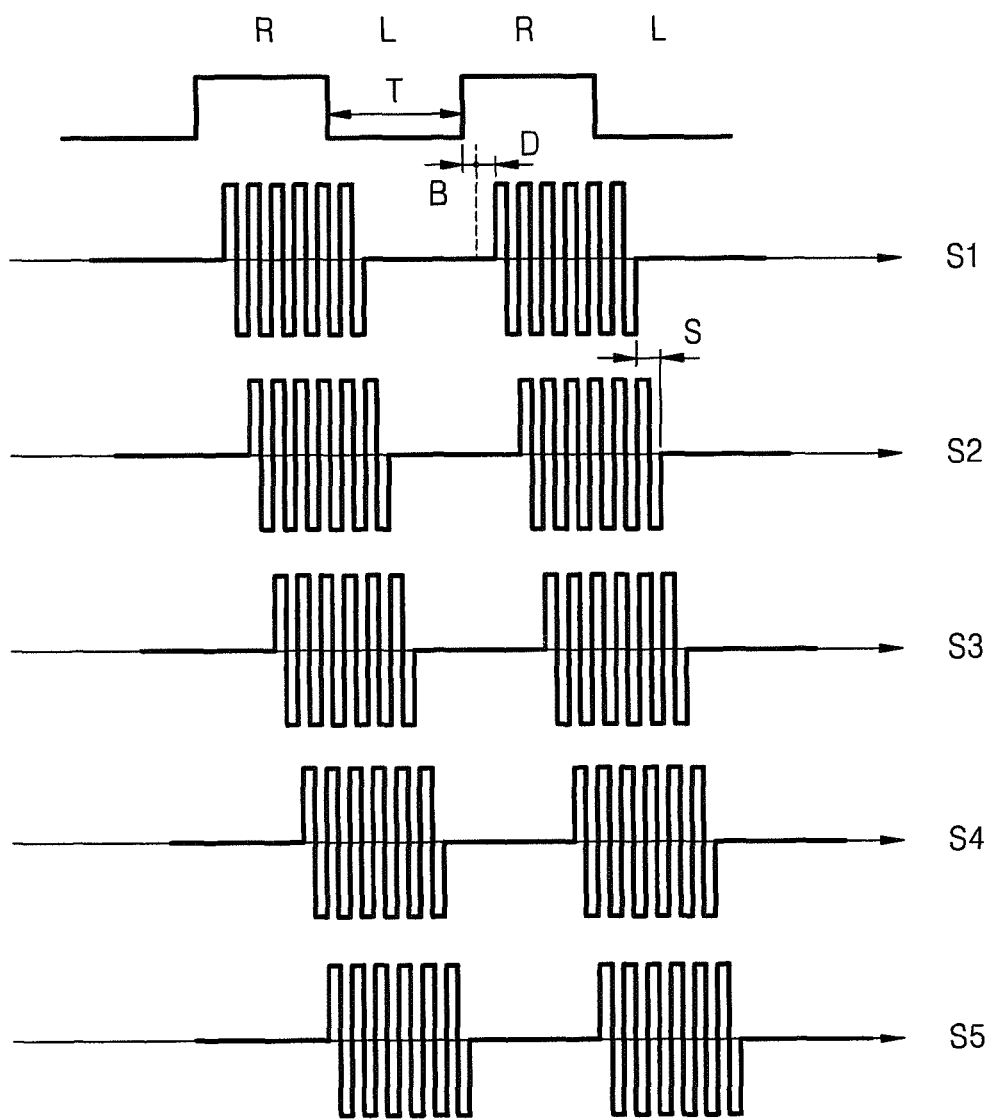

FIGS. 7 and 8 are timing diagrams illustrating a method for driving the sharing type polarization switch 23 according to an exemplary embodiment of the present invention. FIG. 7 illustrates a case where a quasi-static driving signal is used as a driving signal to be applied to the polarization switch 23, and FIG. 8 illustrates a case where a carrier driving signal is used as the driving signal to be applied to the polarization switch 23. In FIGS. 7 and 8, the divided type polarization switch 23 is divided into five segments S1 through S5, for example. However, other numbers of segments are contemplated. In addition, for example, the polarization switch 23 changes the polarization direction of an incident light so that, when an absolute value of a driving signal is high, the polarization direction of an emitted light can coincide with a polarization plate for a left eye of the polarization glasses 25 and when an absolute value of the driving signal is low, the polarization direction of the emitted light can coincide with a polarization plate for a right eye of the polarization glasses 25. In FIGS. 7 and 8, T denotes a period of one frame of the display panel 21 and B denotes a blank time occurring until an image starts being scanned after a vertical synchronization signal is applied to the display panel 21.

According to an exemplary embodiment of the present invention, as illustrated in FIGS. 7 and 8, a time when the driving signal is applied to an initial segment S1 of the divided type polarization switch 23 is delayed by a time D (ms) than the blank time B occurring until the image starts being scanned after the vertical synchronization signal is applied to the display panel. After that, as illustrated in FIGS. 7 and 8, a time when the driving signal is applied to a next segment of the sharing type polarization switch 23 is delayed by a time S in the current segment so that the driving signal is applied to the next segment of the divided type polarization switch 23. When the number of segments of the polarization switch 23 is N, S is obtained using equation 1 below. According to an exemplary embodiment of the present invention, the control unit 24 may include a delay unit (not shown) which adjusts a switching time of the polarization switch 23 by 0 through T so that the delay time D and S can be properly adjusted.

$$S = (T-B)/N \tag{1}$$

Figure 9:
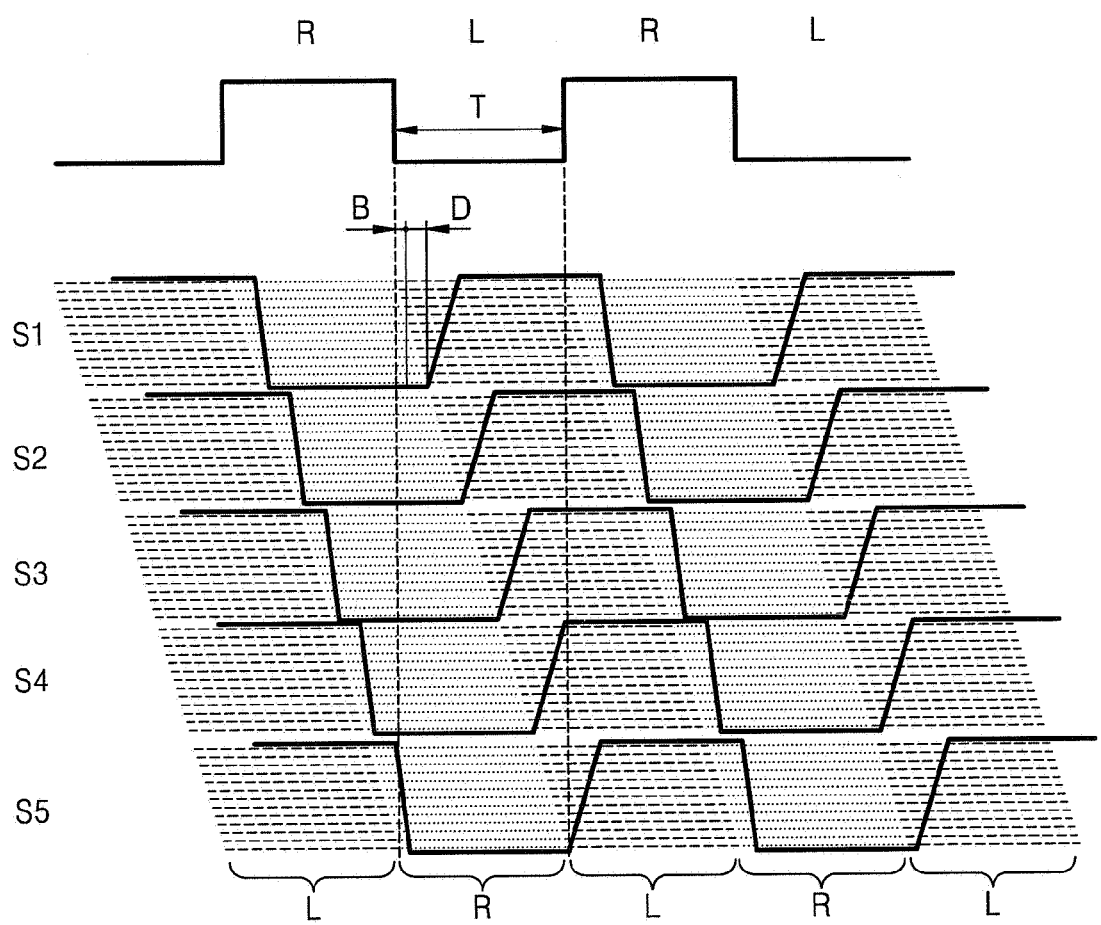
FIG. 9 illustrates a case where a switching operation of the sharing type polarization switch and an image scanning operation of an LCD panel are synchronized when using the method for driving a sharing type polarization switch illustrated in FIGS. 7 and 8.

If a switching delay time of the polarization switch 23 is optimum, as illustrated in FIG. 9, a time when each of segments of the divided type polarization switch 23 is driven nearly coincides with a time when an image is scanned on the sharing type display panel 21 corresponding to each segment. Thus, very little cross-talk occurs. Table 1 shows a simulation result of the amount of change of cross-talk according to a variation in an operating time of the polarization switch 23, so as to determine an optimum delay time D. Here, it is assumed that the polarization switch 23 is divided into five segments and a blank time B is 0 ms. The amount of cross-talk is defined as the ratio of the intensity of a white image to the intensity of a black image which is mixed with the image for a left eye when the image for a left eye is displayed as a complete white image and the image for a right eye is displayed as a complete black image. As illustrated in Table 1, cross-talk is minimum when the value of the time D is 0.8*S ms regardless of a refresh rate (FR) of an LCD. In addition, the amount of cross-talk which occurred when the value of the time D is a negative integer (that is, when the polarization switch 23 starts earlier operating than the blank time B) is much larger than the amount of cross-talk which occurred when the value of the time D is a positive integer. However, when the value of the time D is excessively increased, the amount of cross-talk increases again.

TABLE 1

| FR | D | | | | | |
|---|---|---|---|---|---|---|
| | −0.8 * S ms | −0.5 * S ms | 0 ms | 0.5 * S ms | 0.8 * S ms | 2.0 * S ms |
| 75 Hz (S: 2.66 ms) | 51% | 37.3% | 19.8% | 9.1% | 6.6% | 19.8% |
| 120 Hz (S: 1.66 ms) | 60.9% | 46.0% | 27.0% | 14.9% | 11.1% | 17.1% |

Figure 10A:
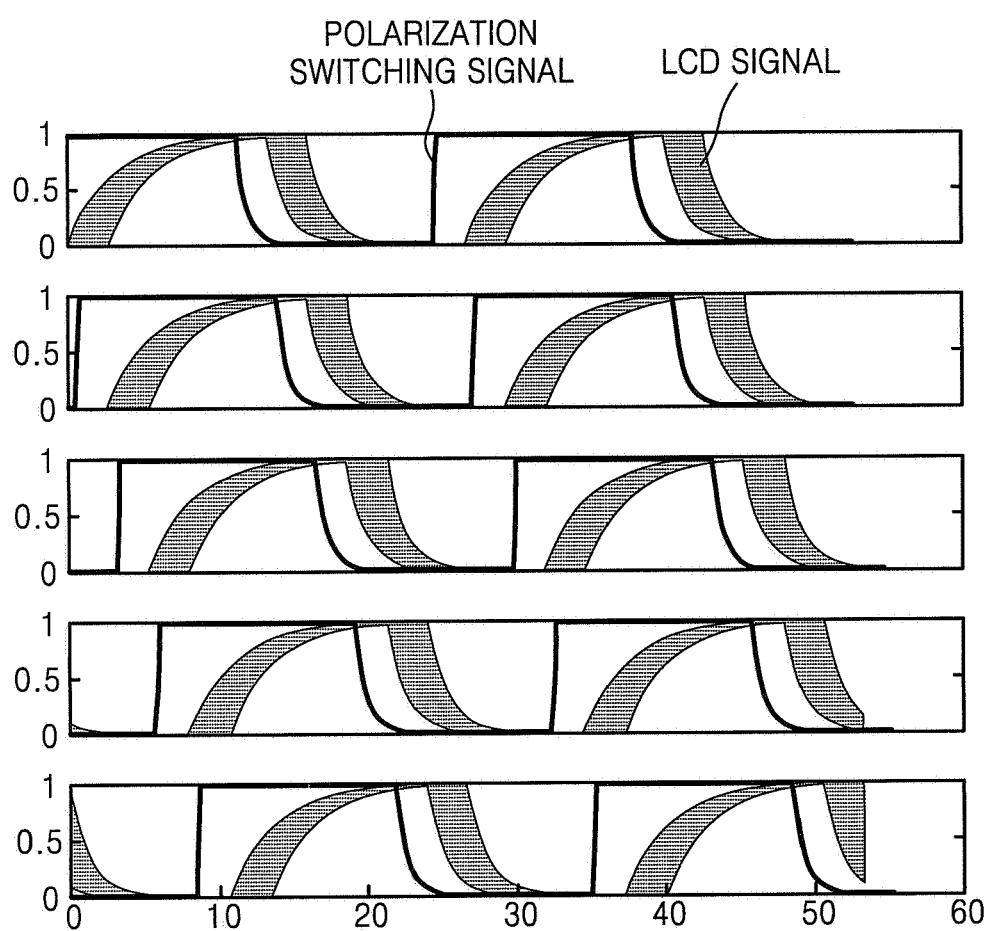
FIGS. 10A and 10B are, respectively, graphs illustrating cross-talk which occurs when the method for driving a sharing type polarization switch illustrated in FIG. 4 is applied to the time sharing type autostereoscopic image display apparatus using an LCD.
Figure 10B:
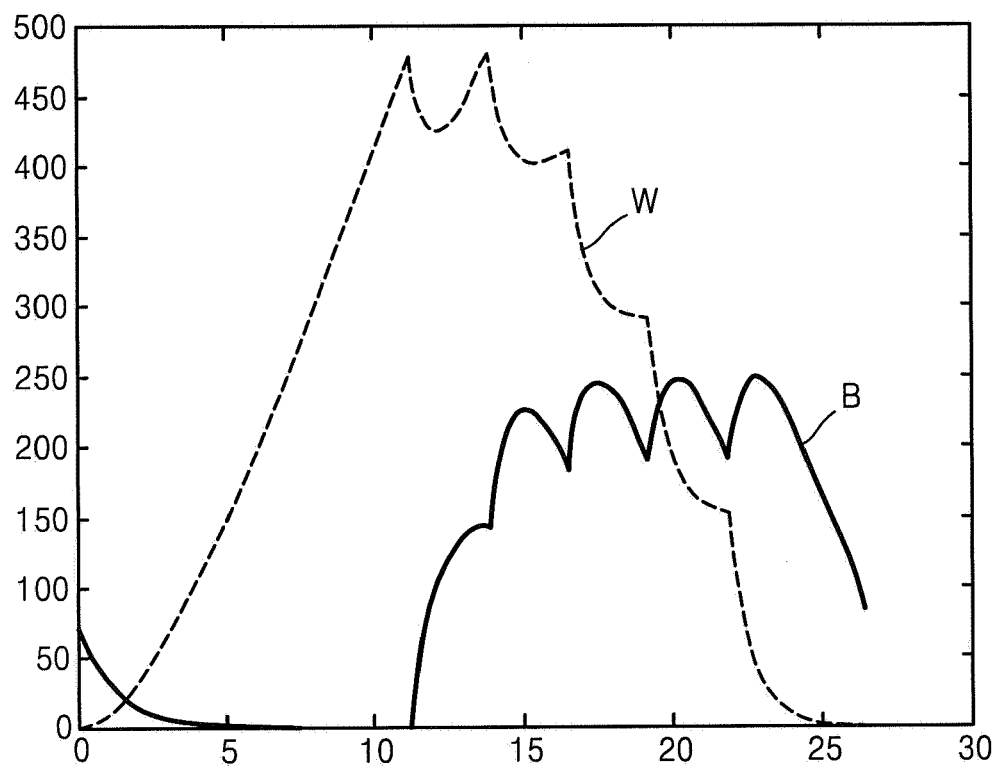

FIGS. 10A through 11B are graphs illustrating the simulation result shown in Table 1. In FIG. 10A, a polarization switching operation in each of segments of a polarization switch according to time is compared with an image scanning operation of an LCD corresponding to each segment when the reproduction speed of the LCD is 75 Hz and the value of the D is −0.8*S ms (that is, −0.8*2.66 ms=−2.13 ms). As illustrated in FIG. 10A, when the value of the time D is −0.8*S ms, the polarization switch and the LCD are not precisely synchronized with each other. In addition, FIG. 10B illustrates a variation in values of a white image W and a black image B, which are detected from a white channel during one frame, according to time on the same condition as that of FIG. 10A. As illustrated in FIG. 10B, a large amount of an undesired black image B is detected from the white channel. According to Table 1, the amount of cross-talk in this case is 51%.

Figure 11A:
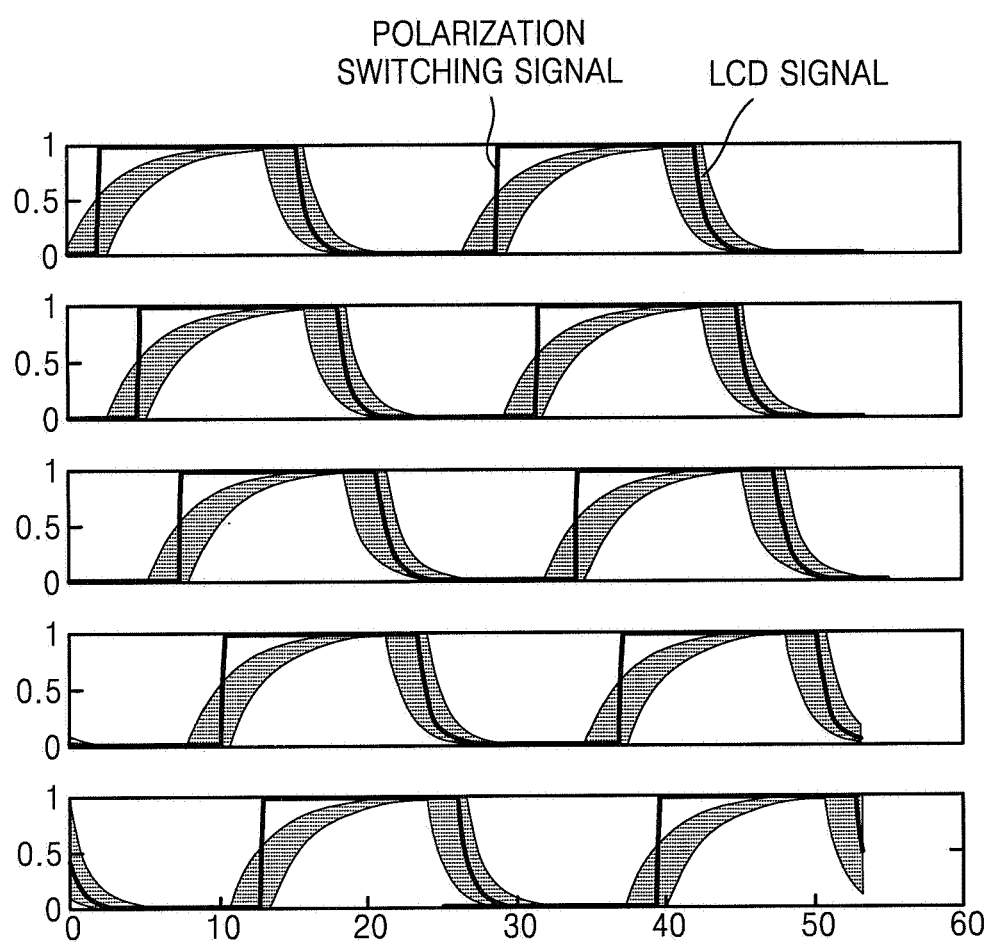
FIGS. 11A and 11B are, respectively, graphs illustrating cross-talk which occurs when the method for driving a sharing type polarization switch illustrated in FIGS. 7 and 8 is applied to the time sharing type autostereoscopic image display apparatus using an LCD.
Figure 11B:
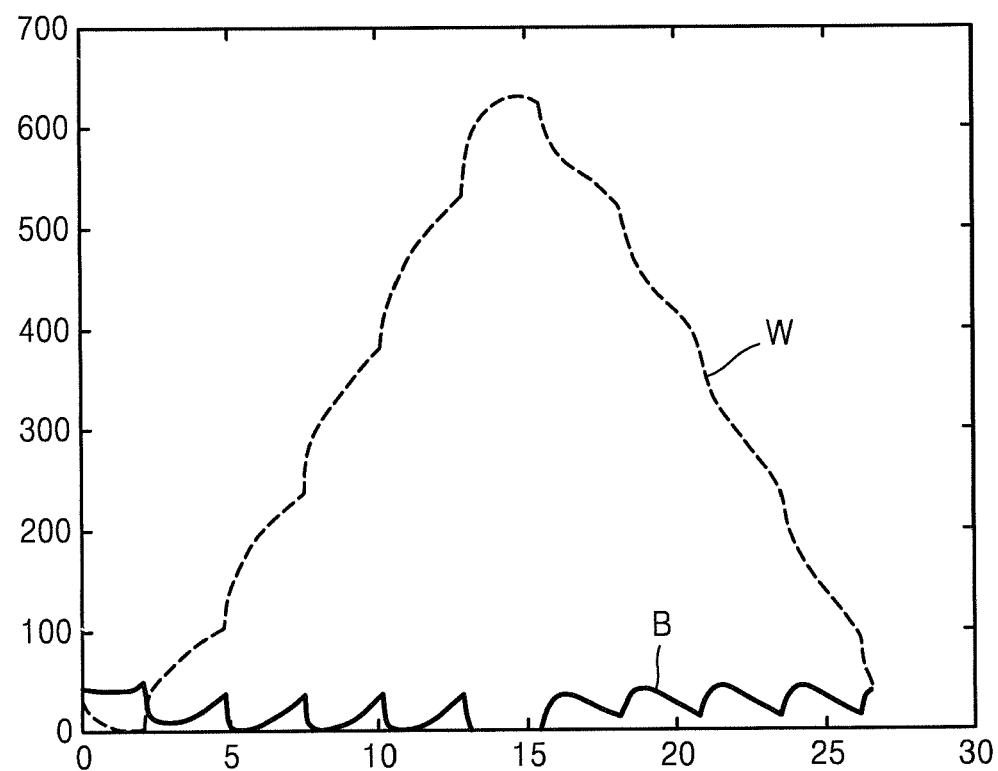

In FIG. 11A, a polarization switching operation in each of segments of a polarization switch according to time is compared with an image scanning operation of an LCD corresponding to each segment when the reproduction speed of the LCD is 75 Hz and the value of the D is 0.8*S ms (that is, 0.8*2.66 ms=2.13 ms). As illustrated in FIG. 11A, when the value of the time D is 0.8*S ms, the polarization switch and the LCD are precisely synchronized with each other. In addition, FIG. 11B illustrates a variation in values of a white image W and a black image B, which are detected from a white channel during one frame, according to time on the same condition as that of FIG. 11A. As illustrated in FIG. 11B, a small amount of an undesired black image B is detected from the white channel. According to Table 1, the amount of cross-talk in this case is 6.6%.

A case where the time sharing type autostereoscopic image display apparatus is a polarization glasses type has been described as above. However, the inventive concept of the present invention may be applied to a non-glasses type time sharing type autostereoscopic image display apparatus in which polarization glasses are not used.

Figure 12:
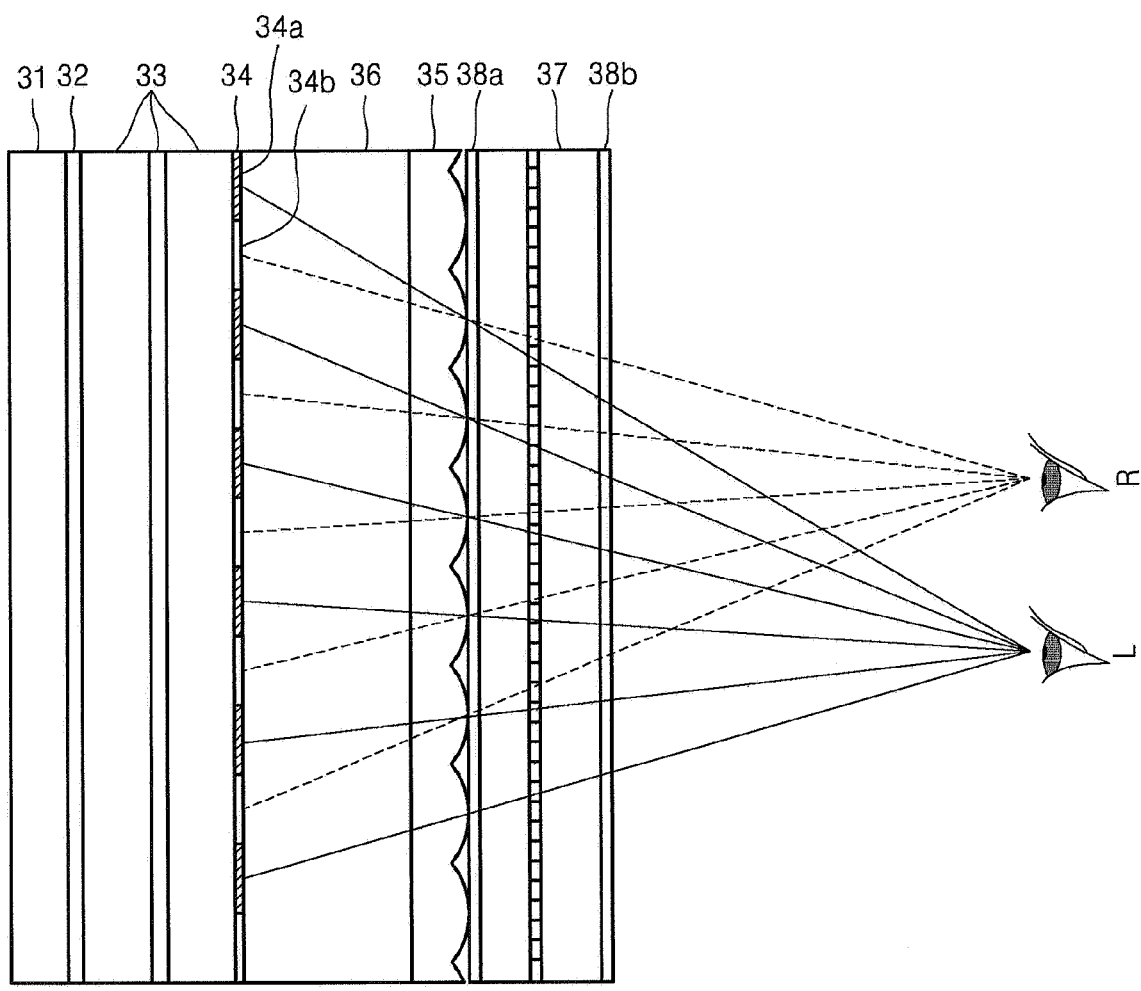
FIG. 12 is a cross-sectional view illustrating the structure of a non-glasses time sharing type autostereoscopic image display apparatus using an LCD according to another exemplary embodiment of the present invention.

FIG. 12 is a cross-sectional view illustrating the structure of a non-glasses time sharing type autostereoscopic image display apparatus using an LCD according to another exemplary embodiment of the present invention. Referring to FIG. 12, a time sharing type autostereoscopic image display apparatus 30 includes a backlight unit 31, a polarization plate 32 which transmits only light in a certain polarization direction, which may be predetermined, among lights emitted from the backlight unit 31, a polarization switch 33 which changes the polarization direction of an incident light according to a control signal, a birefringent element array 34 in which first and second birefringent elements 34a and 34b, respectively, for changing the polarization direction of an incident light are alternately disposed, a lenticular lens sheet 35 which separates the incident light into a left-eye region and a right-eye region and emits the incident light, and a liquid crystal display panel 37 on which an image is displayed. In addition, the liquid crystal display panel 37 includes polarization surfaces 38a and 38b disposed on its incident side and emitted side, respectively.

Like in the previous exemplary embodiment, the polarization switch 33 is divided into a plurality of horizontal segments which are synchronized with an image scanning time of the liquid crystal display panel 37 and are sequentially switched. In addition, according to this current exemplary embodiment, besides the polarization switch 33, the backlight unit 31 may also be divided into a plurality of horizontal segments which can be switched independently. In this case, corresponding segments of the polarization switch 33 and the backlight unit 31 are controlled to be simultaneously switched.

Meanwhile, according to the current exemplary embodiment, each of segments of the divided type polarization switch 33 may be switched between first through third states in which the polarization direction of a light for transmitting each segment is sequentially changed by 45°. For example, the polarization switch 33 may have a first state where the polarization direction of an incident light is not changed, a second state where the polarization direction of the incident light is changed by 45°, and a third state where the polarization direction of the incident light is changed by 90°. The polarization switch 33 includes electrically-controllable elements having three anisotropy states according to an applied voltage. For example, an electrically-controllable liquid crystal retarder can be used as the polarization switch 33. When the polarization switch 33 is a liquid crystal retarder, for example, the polarization switch 33 does not delay the incident light in the first state, phase-delays the incident light in the second state by a ¼ wavelength (λ/4) in the second state, and phase-delays the incident light by a ½ wavelength (λ/2) in the third state.

In addition, as illustrated in FIG. 12, the birefringent element array 34 is formed when the first and second birefringent elements 34a and 34b are alternately disposed along a horizontal direction. The first and second birefringent elements 34a and 34b are respectively formed long in a longitudinal direction of the autostereoscopic image display apparatus 30 and are alternately arranged in the horizontal direction. According to an exemplary embodiment of the present invention, the birefringent element array 34 changes the polarization direction of the incident light so that the polarization directions of lights, each of which transmitting the first and second birefringent elements 34a and 34b can be perpendicular to each other.

The first and second birefringent elements 34a and 34b may be respectively comprised of polarizers having polarization planes in a certain direction, for example. The certain direction may be predetermined. In this case, the polarization plane of the polarizer of the first birefringent element 34a is perpendicular to the polarization plane of the polarizer of the second birefringent element 34b. In addition, the first and second birefringent elements 34a and 34b may also be respectively comprised of retarders for delaying an incident light by a certain phase. The certain phase may be predetermined. In this case, a phase delay difference between the retarder of the first birefringent element 34a and the retarder of the second birefringent element 34b is $\lambda/2$. For example, the first birefringent element 34a may not delay a phase and the second birefringent element 34b may phase-delay by $\lambda/2$ or the first birefringent element 34a may phase-delay by $-\lambda/4$ and the second birefringent element 34b may phase-delay by $+\lambda/4$. In addition, the first and second birefringent elements 34a and 34b may also be comprised of rotators for rotating an incident light at a certain angle. The certain angle may be predetermined. In this case, a rotation angle difference between the rotator of the first birefringent element 34a and the rotator of the second birefringent element 34b is 90°. For example, the first birefringent element 34a may not rotate the incident light and the second birefringent element 34b may rotate the incident light at an angle of 90° or the first birefringent element 34a may rotate the incident light at an angle of −45° and the second birefringent element 34b may rotate the incident light at an angle of +45°.

Thus, lights which are transmitted through the polarization switch 33 and the birefringent element array 34 may have one of the following polarization directions according to the state of the polarization switch 33, that is, (1) a polarization direction in which light transmitting through the first birefringent element 34a is perpendicular to an incident side-polarization plane 38a of the liquid crystal display panel 37 and light transmitting through the second birefringent element 34b is parallel to an incident side-polarization plane 38a of the liquid crystal display panel 37, (2) a polarization direction in which light transmitting through the first birefringent element 34a is parallel to the incident side-polarization plane 38a of the liquid crystal display panel 37 and light transmitting through the second birefringent element 34b is perpendicular to the incident side-polarization plane 38a of the liquid crystal display panel 37, or (3) a polarization direction in which lights transmitting through the first and second birefringent elements 34a and 34b are circularly-polarized lights or linearly-polarized lights that are inclined to the incident side-polarization plane 38a of the liquid crystal display panel 37 by 45°.

Meanwhile, the lenticular lens sheet 35 is formed when a plurality of lenticular lens elements are arranged along the horizontal direction. Thus, each of the lenticular lens elements is formed long in the longitudinal direction of the autostereoscopic image display apparatus 30 to be parallel to the first and second birefringent elements 34a and 34b of the birefringent element array 34. The lenticular lens sheet 35 separates the incident light into a left-eye region and a right-eye region and emits the incident light. That is, lights transmitting the lenticular lens sheet 35 are separated into the left-eye region and the right-eye region, respectively, according to incidence positions and are imaged in the left-eye region and the right-eye region, respectively. For example, light emitted from the first birefringent element 34a may be guided to the left-eye region through the lenticular lens sheet 35 and light emitted from the second birefringent element 34b may be guided to the right-eye region through the lenticular lens sheet 35, respectively.

As well-known, an interval between the left-eye region and the right-eye region from a visible distance may be about 65 mm. To this end, a pitch between the lenticular lens elements of the lenticular lens sheet 35 may be the same as or advantageously, may be a little smaller than a pitch between the pair of first and second birefringent elements 34a and 34b of the birefringent element array 34. In addition, a distance between the lenticular lens sheet 35 and the birefringent element array 34 may be the same as or advantageously, may be a little larger than a focus distance of the lenticular lens element. As illustrated in FIG. 12, in order to fix a position between the lenticular lens sheet 35 and the birefringent element array 34, a transparent substrate 36 may be disposed between the lenticular lens sheet 35 and the birefringent element array 34.

Figure 13:
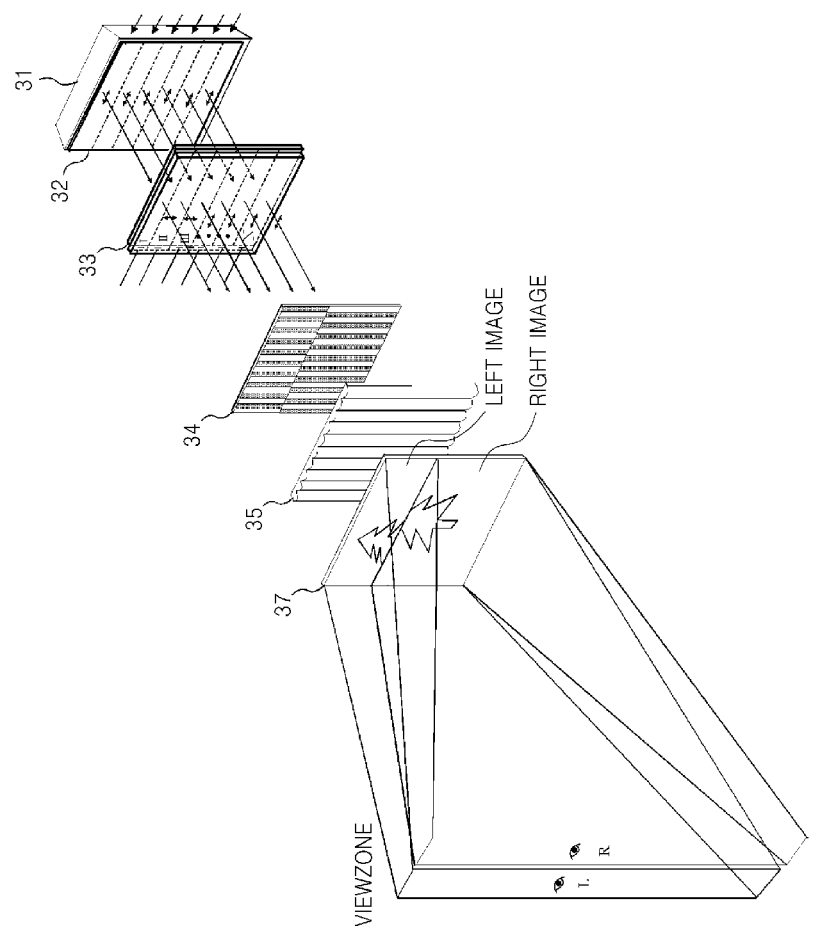
FIG. 13 is a perspective view illustrating the operation of the non-glasses time sharing type autosteroscopic image display apparatus illustrated in FIG. 12.

The operation of the autostereoscopic image display apparatus 30 illustrated in FIG. 12 will now be described in detail with reference to FIG. 13. Hereinafter, only for explanatory conveniences, it is assumed that the polarization plate 32 has a horizontal polarization direction and the incident side-polarization surface 38a of the liquid crystal display panel 37 has a vertical polarization direction. In addition, it is also assumed that each of segments of the divided type polarization switch 33 has a first state in which the polarization direction of an incident light is not changed, a second state in which the polarization direction of the incident light is changed by 45° and a third state in which the polarization direction of the incident light is changed by 90°. In addition, it is also assumed that the first birefringent element 34a is a retarder which does not perform phase-delay and the second birefringent element 34b is a retarder which phase-delays by a half wavelength ($\lambda/2$).

First, the liquid crystal display panel 37 starts displaying an image for a left eye or right eye. Then, each of segments of the polarization switch 33 and the backlight unit 31 is switched in synchronization with an image scanning time of the liquid crystal display panel 37. In this time, in order to prevent cross-talk, each segment of the polarization switch 33 is controlled so that a polarization switching operation of the polarization switch 33 is delayed by an amount of time than a time when an image starts being scanned on the liquid crystal display panel 37 corresponding to the segment. As described previously, when D denotes a delay time and S denotes a time interval between adjacent segments, an optimum delay time 0.8*S ms.

Meanwhile, each segment of the polarization switch 33 is switched so that a polarization state is changed depending on whether an image displayed on the liquid crystal display panel 37 corresponding to the segment is for a left eye or right eye. For example, when one segment of the polarization switch 33 is in the first state, the polarization direction of light which transmits through the polarization plate 32 and is incident on the segment is not changed. Thus, the light transmitting through the segment has a horizontal polarization direction. After that, light transmits through the first and second birefringent elements 34a and 34b, respectively. At this time, light transmitting through the first birefringent element 34a has the horizontal polarization direction without changes but the polarization direction of light transmitting through the second birefringent element 34b is changed by 90° and has the vertical polarization direction. Lights transmitting through the first and second birefringent elements 34a and 34b in this way are separated by the lenticular lens sheet 35 into the left-eye region and the right-eye region, respectively, and are guided to the left-eye region and the right-eye region, respectively. After that, the light transmitting through the first birefringent element 34a has polarization perpendicular to the incident side-polarization plane 38a of the liquid crystal display panel 37 and thus is intercepted. The light transmitting through the second birefringent element 34b is parallel to the incident side-polarization plane 38a of the liquid crystal display panel 37 and thus may pass through the liquid crystal display panel 37 and may be imaged in the right-eye region R. Thus, if the liquid crystal display panel 37 corresponding to each segment of the polarization switch 33 in the first state displays the image for a right eye, a user senses only the image for a right eye through his/her own right eye.

In addition, when one segment of the polarization switch 33 is in the third state, the polarization direction of light transmitting through the segment is changed by 90°. Thus, the light transmitting through the segment has a vertical polarization direction. After that, the light transmits through the first and second birefringent elements 34a and 34b, respectively. At this time, the light transmitting through the first birefringent element 34a has the vertical polarization direction without changes but the polarization direction of the light transmitting through the second birefringent element 34b is changed again by 90° and has the horizontal polarization direction. After that, the light is separated by the lenticular lens sheet 35 into the left-eye region and the right-eye region, respectively, and is guided to the left-eye region and the right-eye region, respectively. At this time, the light transmitting through the second birefringent element 34a has polarization perpendicular to the incident side-polarization plane 38a of the liquid crystal display panel 37 and thus is intercepted. On the other hand, the light transmitting through the second birefringent element 34b is parallel to the incident side-polarization plane 38a of the liquid crystal display panel 37 and thus may pass through the liquid crystal display panel 37 and may be imaged in the left-eye region L. Thus, if the liquid crystal display panel 37 corresponding to each segment of the polarization switch 33 in the third state displays the image for a left eye, the user senses only the image for a left eye through his/her own left eye.

According to this principle, if a segment of the polarization switch 33 corresponding to a pixel portion of the liquid crystal display panel 37 on which the image for a right eye is displayed, is switched into the first state and a segment of the polarization switch 33 corresponding to a pixel portion of the liquid crystal display panel 37 on which the image for a left eye is displayed, is switched into the third state, the user can view an autostereoscopic image. In this case, as described previously, in order to prevent cross-talk, each segment of the polarization switch 33 is controlled so that a polarization switching operation of the polarization switch 33 starts while being delayed by an amount of time relative to a time when an image starts being scanned on the liquid crystal display panel 37 corresponding to the segment. The amount of time may be predetermined.

Meanwhile, when the polarization switch 33 is in the second state, the polarization direction of light which transmits through the polarization plate 32 and is incident on the polarization switch 33 is changed by 45°. Thus, the light transmitting through the polarization switch 33 has the polarization direction directed toward an angle of 45°. After that, the light transmits through the first and second birefringent elements 34a and 34b, respectively. At this time, the light transmitting through the first birefringent element 34a has the polarization direction directed toward an angle of 45° without changes and the polarization of the light transmitting through the second birefringent element 34b is changed by 90° and has the polarization direction directed toward an angle of 135°. As a result, the lights transmitting through the first and second birefringent elements 34a and 34b pass through the liquid crystal display panel 37 and are imaged in the left-eye region and the right-eye region. Thus, if the liquid crystal display panel 37 displays a two-dimensional (2D) image, the user can view the 2D image through his/her own left eye and right eye. According to the current exemplary embodiment, there is no worry about cross-talk while the image is displayed. Thus, there is no problem even though that all of segments of the polarization switch 33 are simultaneously kept in the second state.

As described above, according to exemplary embodiments of the present invention, a time sharing type autostereoscopic image display apparatus in which cross-talk rarely occurs even when a hold type display such as an LCD is used can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A time sharing type autostereoscopic image display apparatus comprising:
   a display panel;
   a polarization switch which is disposed on a front surface of the display panel and is divided into N segments to be independently driven to change a polarization direction of an incident light; and
   a control unit which controls the polarization switch so that each of the N segments is driven in synchronization with an image scanning time of the display panel corresponding to each segment,
   wherein the control unit controls the polarization switch so that a time when a driving signal is applied to an initial segment of the N segments of the polarization switch is delayed relative to a time when an image starts to be scanned after a vertical synchronization signal is applied to the display panel.

2. The apparatus of claim 1, wherein a relationship $D=0.8*S$ ms is satisfied, where D denotes the delay time of the driving signal applied to the initial segment and S denotes a driving time interval between two adjacent segments of the N segments.

3. The apparatus of claim 2, wherein a relationship $S=(T-B)/N$ is satisfied, where T denotes a period of one frame of the display panel, and B denotes a blank time until an image starts being scanned after a vertical synchronization signal is applied to the display panel.

4. The apparatus of claim 3, wherein the control unit comprises a delay unit which adjusts a switching time of the polarization switch by 0 through T.

5. The apparatus of claim 1, wherein the display panel is a liquid crystal display (LCD).

6. The apparatus of claim 1, wherein the display panel is a plasma display panel (PDP), an organic light-emitting device (OLED), or a field emission device (FED), and a linear polarization plate is disposed between the display panel and the polarization switch.

7. The apparatus of claim 1, wherein the time sharing type autostereoscopic image display apparatus is a polarization glasses type.

8. A method for driving a time sharing type autostereoscopic image display apparatus, the method comprising:
   controlling the time sharing type autostereoscopic image display apparatus so that a time when a driving signal is applied to an initial segment of a polarization switch is delayed relative to a time when an image starts to be scanned after a vertical synchronization signal is applied to a display panel of the time sharing type autostereoscopic image display apparatus.

9. The method of claim 8, wherein a relationship $D=0.8*S$ ms is satisfied, where D denotes the delay time of the driving signal applied to the initial segment and S denotes a driving time interval between two adjacent segments of the polarization switch.

10. The method of claim 9, wherein a relationship $S=(T-B)/N$ is satisfied, where T denotes a period of one frame, and B denotes a blank time until an image starts being scanned after a vertical synchronization signal is applied to the display panel.

11. The method of claim 8, wherein the display panel is a liquid crystal display (LCD).

* * * * *